June 5, 1923.  1,457,829
L. ERHARDT
KNIFE CONTROL IN MACHINES FOR HARVESTING SUGAR BEETS
Filed Dec. 15, 1921
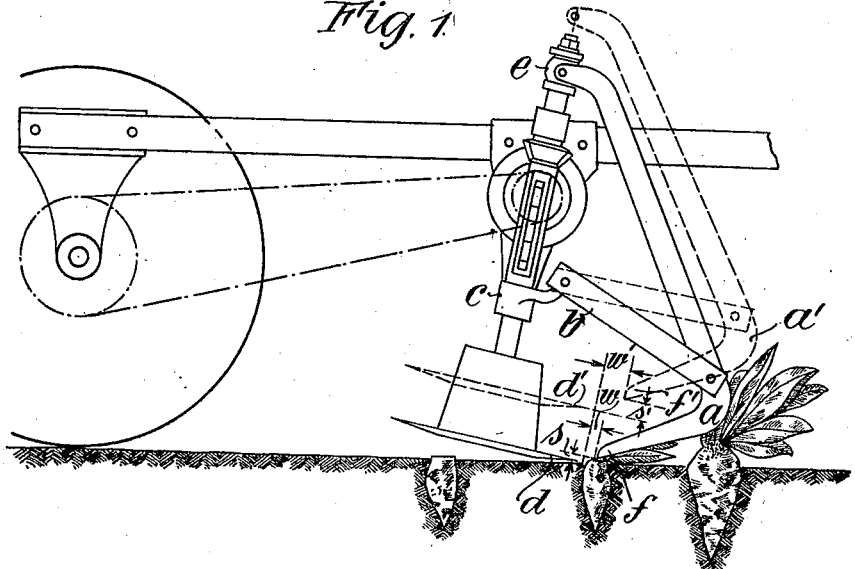
Fig. 1
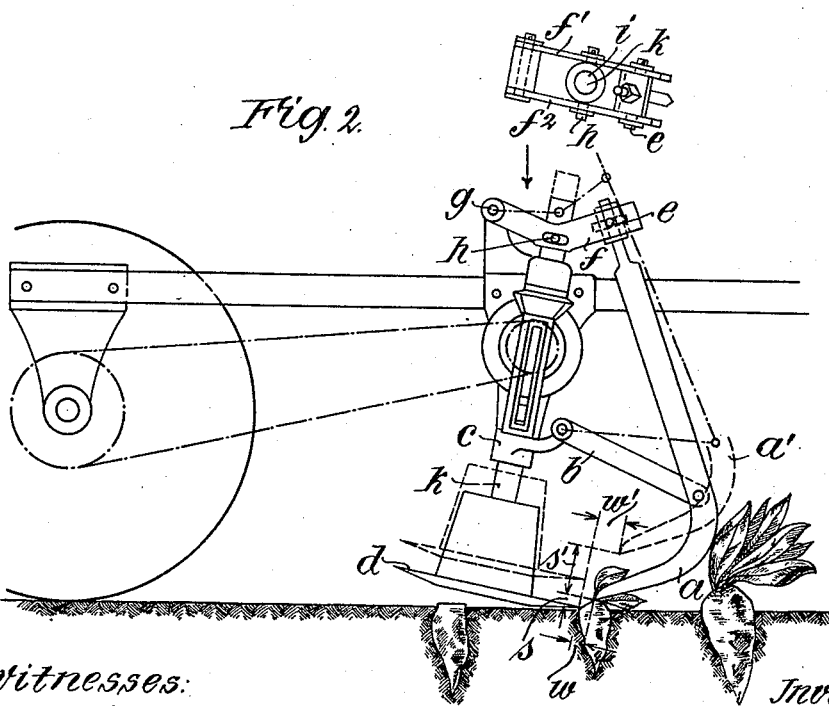
Fig. 2.
Fig. 3.
Witnesses:
Emil Kayser
Robert Schaper
Inventor
Ludwig Erhardt.
by:
Edward C. Sawell
Attorney.

Patented June 5, 1923.

1,457,829

UNITED STATES PATENT OFFICE.

LUDWIG ERHARDT, OF BERNBURG, GERMANY, ASSIGNOR OF ONE-HALF TO W. SIEDERSLEBEN & CO., OF BERNBURG, GERMANY.

KNIFE CONTROL IN MACHINES FOR HARVESTING SUGAR BEETS.

Application filed December 15, 1921. Serial No. 522,495.

*To all whom it may concern:*

Be it known that I, LUDWIG ERHARDT, a citizen of the German Republic, residing at Bernburg, Germany, have invented certain new and useful Improvements in Knife Control in Machines for Harvesting Sugar Beets, of which the following is a specification.

It has already been proposed to use in harvesting machines for sugar beets which cut the top of the beets in the ground by means of knives adjustable in vertical direction, feelers for adjusting the vertical position of the knives in accordance with the height of the top projecting from the ground, said feelers moving in advance of the knives and being connected with the same in such a manner that the knives are raised or lowered according to the height of the beet top to be cut.

In order that the invention may be clearly understood I shall proceed to describe the same with reference to the two forms of construction which are shown by way of example on the accompanying drawing wherein:—

Fig. 1 shows in side elevation the first form of construction of the mechanism,

Fig. 2 is a similar view of the second form of construction.

Fig. 3 shows in plan view a constructional detail view of Fig. 2.

Referring to Fig. 1 the feeler $a$ is hingedly connected at its lower part by means of a link $b$ with the support $c$ for the knife $d$ which is adjustable in vertical direction. The upper end of the feeler $a$ is hinged at $e$ to the spindle of the knife $d$. If now the feeler $a$ be lifted by a larger sized sugar beet, for instance to the position $a^1$, the knife is brought at the same time to the position $d^1$. Owing to the hereinbefore described connection of the feeler $a$ with the support $c$ the rear end $f$ of the feeler $a$ which runs up on the beet top moves to the position $f^1$. Whilst in the position $f$ the horizontal distance of the end of the feeler from the edge of the knife $d$ is equal to $w$, it is in the position $f^1$ much larger equal to $w^1$. The vertical distance $s$ is increased in a similar manner to the distance $s'$.

From this arrangement results that the lower point $f$ of the feeler $a$ has arrived, at the moment at which the knife $d$ is cutting into the top of the sugar beet, approximately at the highest point of the sugar beet so that the knife having already cut into the beet, the feeler can no longer raise this knife. Owing to the arrangement described larger tops are cut off of the sugar beets of larger size than usual and this is necessary for practical reasons.

This latter requirement is even better fulfilled by the second form of construction of the device shown in Fig. 2, as in this case the arrangement is such that the knife participates in a lesser measure in the vertical displacement of the feeler than is the case according to the first form of construction. The feeler is not directly connected with the spindle of the knife but indirectly by the intermediary of a transmission which transfers the raising movement of the knife spindle on a reduced scale.

The feeler $a$ is connected with the support $c$ for the spindle $k$ of the disk shaped knife $d$ by a link $b$. The upper end of the feeler $a$ is hingedly connected at $e$ with a lever $f$ pivotally mounted at $g$ upon the frame of the machine and whose parts $f^1$, $f^2$ (Figure 3) embrace by means of slots studs $h$ of a collar $i$ which is revolubly mounted upon the knife spindle but prevented from moving upon said spindle in longitudinal direction.

The drawing shows the parts in the position which they assume if a small sized sugar beet is to be cut. The feeler $f$ stands comparatively deep and the knife works in close proximity of the ground.

The distance between feeler and knife is designated by $s$. At $a^1$ a comparatively high position of the feeler is indicated in dash lines. In this position of the feeler the distance $w$ between the knife edge and the end of the feeler has increased to $w^1$. The corresponding position of the knife indicated in dash lines differs however from the initial position of the knife much less than the position of the feeler differs from the initial position of the same.

The position of the end of the feeler in vertical direction has altered for the distance $s'$ which is so large that for practical purposes a comparatively larger top part of a large sized sugar beet is cut off than of a small sized sugar beet.

When a lever $f$ is used as transmission member the relation between the movements of the feeler and the knife spindle can be easily varied by adjusting the position of the point e. For the lever any other convenient elements for producing the transmission could be substituted.

I claim:—

1. An improved knife control in machines for harvesting sugar beets comprising in combination with the feeler, the cutting knife, the knife spindle and the support for for the knife spindle, a link connecting said feeler with said support, and an upwardly directed extension of the feeler hingedly connected with the knife spindle.

2. An improved knife control in machines for harvesting sugar beets comprising in combination with the feeler, the cutting knife, the knife spindle and the support for the knife spindle, a link connecting said feeler with said support, and a transmission gear connecting the upper end of said feeler with said knife spindle.

3. An improved knife control in machines for harvesting sugar beets comprising in combination with the feeler, the cutting knife, the knife spindle and the support for the knife spindle, a link connecting said feeler with said support, and a two armed lever hingedly connected at one end with the frame of the machine having slots, and hingedly and adjustably connected at the other end with the upper end of said feeler, a collar revolubly connected upon said knife spindle so that it cannot move in longitudinal direction and lateral studs of said collar engaging with the slots of said two armed lever.

In testimony whereof I affix my signature in the presence of two witnesses.

LUDWIG ERHARDT.

Witnesses:
 ARTHUR SCHOLZ,
 HILDEGARD HAMANN.